United States Patent Office 3,440,655
Patented Apr. 22, 1969

3,440,655
SPACE ABSORBERS FOR ELECTROMAGNETIC WAVES
Ludwig Wesch, Heidelberg, and Hartmut Fromme, Igelsbach, Germany, assignors to Electro G.m.b.H. & Co., Heidelberg, Germany
Filed Feb. 23, 1967, Ser. No. 618,133
Claims priority, application Germany, Feb. 26, 1966, E 31,114
Int. Cl. H01q 17/00
U.S. Cl. 343—18                     9 Claims

ABSTRACT OF THE DISCLOSURE

An absorber construction for blocking propagated electromagnetic waves comprising a plurality of spaced flat or tube-like walls arranged parallel to the direction of propagation of said waves and having a conductive material on their external surfaces which has an increasing conductivity in the direction of propagation, all spaces within the walls and between adjacent walls being filled with a foam material.

This invention relates to space absorbers for electromagnetic waves and more particularly to absorbers of high-strength material.

It is known that space absorbers for electromagnetic waves can be produced by a variety of methods. For example, there are used foams or foamed electomers, whose open pores are impregnated with a conductive material. Very often, these space absorbers are provided with specific shapes and may be produced, for example, in wedge form. Such space absorbers are made of electomers as well as those made of foamed material, e.g. Styroper, however, have been found to have poor mechanical properties and thus cannot be used as structural elements.

Structural elements obviously require a high mechanical strength, high values being required both for the compressive strength and for the tensile and bending strengths. Although it is known that a higher mechanical strength for space absorbers can be attained, for example, by the use of honeycombs, it has been noted that such honeycombs, which are usually made of paper walls or very thin plastic walls, do not meet the strength requirements to the extent necessary.

It is an object of the invention to provide improved absorbers adapted for use as structural elements for which purpose a suitable compressive strength as well as tensile, bending and other such strengths are provided.

To achieve the above and other of its objectives, there are now proposed space absorbers having walls of glass and/or other fibers or wound-filament tubes impregnated with a casting resin, such walls being provided with a conductivity in a manner to be later described and being arranged in association with a foam in a spatial relationship corresponding with the wavelengths to be encountered Other objects and features of the invention will be apparent from the following detailed description as illustrated in the accompanying drawing, in which:

FIGURE 1 diagrammatically shows the arrangement of two walls provided in accordance with the invention;

FIGURE 2 diagrammatically shows an arrangement of tubes having walls provided in accordance with the invention;

FIGURE 2a diagrammatically shows a layer of a wound-filament wall which is used in accordance with an embodiment of the invention;

FIGURE 2b diagrammatically shows a second layer which is superposed on the layer of FIG. 2a;

Figure 1:
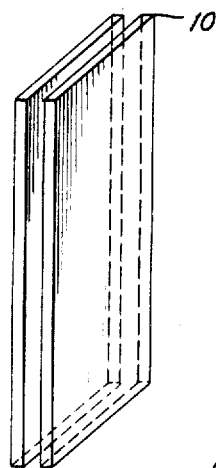
Figure 2:
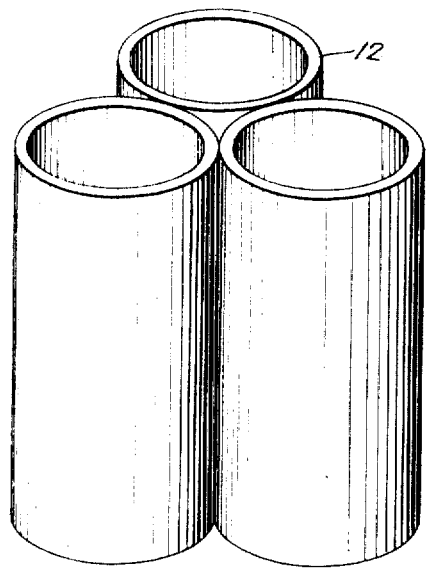
Figure 3:
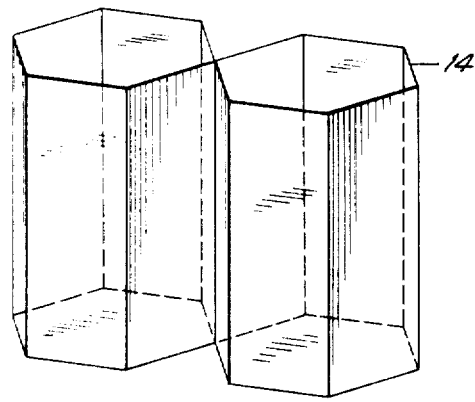
FIGURE 3 shows a variation of FIG. 2.

To obtain a high-strength structural material with absorber action, whose damping values in a relatively small layer thickness are 30 db and moreover a very wide range of wavelengths, an absorber is proposed inclusive of, for example, walls 10 which are arranged in parallel with each other as shown in FIG. 1. Alternatively, the walls may be formed of tubes 12 lying close together side by side (FIG. 2) and these tubular walls may have various cross-sections as FIG. 3 shows in the form of hexagonal tubes 14.

For making these walls, there are used specially produced constructions of glass fiber mats, glass fiber fabrics, glass fiber honeycombs, and glass fiber filament-winding tubes.

These are provided on the outside with a conductivity coating, with the provision that in the direction of the entering wave the conductivity coating must have decreasing surface resistance. The conductivity coating is produced by a vapor deposition process, or graphite and/or carbon black mixtures can be applied in known manner, or semi-conductor materials, for example, SiC, can be used in mixture with graphite or carbon black. After the production of the surface conductivity, the constructions are impregnated with a casting resin which forms a very good union with the glass fiber fabrics, especially casting resins on a base of polyester, expoxide, or hydrocarbon resins. If the constructions are produced in plate form, as shown in FIG. 1, these plates are installed side by side at a distance which depends in known manner on the maximum wavelength range to be blocked, and the spaces between the walls are filled with foams. Preferably, foams are used which bond especially well with the materials of the casting resins. Most suitable for this purpose are polyurethane foams.

Figure 4:
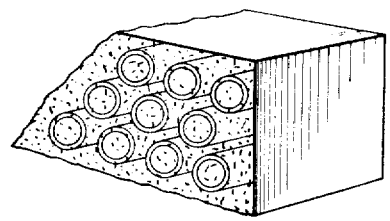
FIGURE 4 shows in perspective a portion of a space absorber in the form of a wall type structure with tubular wall elements therein.
Figure 2A:
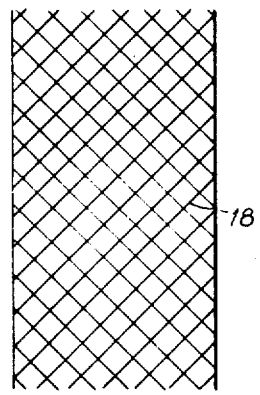
Figure 2B:
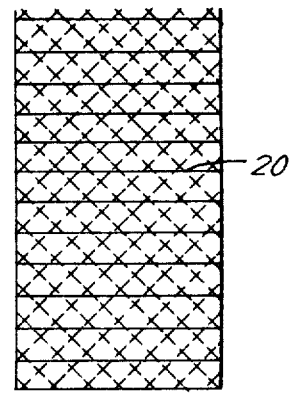

In another instance, high-strength materials can be produced in that tubes are first made by the filament-winding method. Their construction is effected, for example, according to FIGS. 2A and 2B. In this case, first one or more layers of cross windings 18 are produced by the filament-winding method and then the cross winding is consolidated with a layer of special windings 20 laid perpendicular to the axis of the tube. Then a third or more additional winding layers follow in cross winding bond. By this construction, the tube acquires high compressive strength, and the stiffness of the tube gives the resulting space absorber the best possible quality. After completion of such a plastic tube, the inside or the outside of the tube is provided with the conductivity coating, and subsequently the tubes are cut to desired length and are set side by side in a mold and filled with foam to produce a wall structure as shown in FIG. 4.

By the filament-winding method, angular forms, e.g. hexagonal, can also be produced, according to FIG. 3, and the forms may be such that very close packing of the individual bodies takes place and a honeycomb type structure is formed. The distance between the individual tubes should not be greater than $\lambda/2$, and the diameter of the individual tube again depends on the maximum wavelength which is to be absorbed.

Especially when foams with very many open pores are used, the space absorbers are protected by cover layers which extend normal to the incident electromagnetic waves. The thickness of the cover layers should be smaller than $\lambda/8$ of the smallest wavelength to be blocked.

It is possible also to effect an adaptation of the space absorber to the field wave resistance of the free space, namely in that there are applied as cover layers such a combination of layers as will adapt the field wave resistance of the free space to the field wave resistance of the space absorber. Individual layers are used for this in which the dielectric constant increases in at least five steps from the external space to the surface of the absorber. The outermost layer should have a dielectric constant of approximately $\epsilon_r = 1.5$, and the layer facing the absorber, a dielectric constant which is 10% lower than the dielectric constant of the total material of the space absorber.

Space absorbers produced in the above-mentioned manner can be used directly for the construction of wall type structures. It is possible also to line up the individual tubular structure separately and to fill them with foam so that any form can be given to the wall type structures. The compressive, tensile, and bending strengths of such a wall provide a wall of light construction, and gives at the same time the advantages of heat and sound insulation.

The surface protection of the space absorber is effected with a protective varnish resistant to external influences. The dielectric constant of this protective varnish should be in the order of magnitude of the dielectric constant of the total material of the space absorber.

Space absorbers of high-strength are thus provided, characterized in that walls, lying in the direction of propagation of an electromagnetic wave are constructed of glass fibre mats, glass fibre fabrics, glass fibre honeycombs and/or glass fibre filament-winding tubes of various forms, are rendered conductive in the direction of the incident wave, the conductivity increasing in the direction of the traveling wave, the walls being impregnated with a casting resin, and the high strength wall or tube type structures produced upon hardening being arranged side by side at distances not less than $\lambda/5$ of the longest wavelength to be blocked, all cavities in the resulting structure being filled with foam.

The space absorbers produced in the above-mentioned manner may be used directly for the construction of wall type structures, such as test rooms or communication towers. The space absorbers are filled with foam after adjustment of the conductivity, it being possible to establish the compressive, tensile, and bending strength by the mechanical quality of the foam material. Preferably the volumetric weight of the foam should decrease in the direction of the free space, preferably using toward the external space foams having a volumetric weight of 50 to 100 kg./cu. in.

As surface protection of the foam-filled space absorber there is applied a protective varnish or protective foil resistant to external influences; the dielectric constant of this protective foil should not substantially exceed a value of about 2.

What is claimed is:
1. A construction for absorption of electromagnetic waves comprising a plurality of wall elements arranged parallel to the direction of propagation of the electromagnetic energy and consisting of glass fiber material, said wall elements having an external surface with a conductive coating thereon which has a surface resistance decreasing in the direction of the incident waves; said wall elements being entirely impregnated with a resin and arranged adjacent to each other at mutual spacing of less than one-half the longest wave length to be absorbed; and a foam material filling all spaces within the wall elements and between the adjacent wall elements.

2. A construction as claimed in claim 1 comprising a cover on said wall elements perpendicular to the direction of propagation and of a thickness less than $\lambda/8$ of the wavelength to be blocked and including a plurality of layers of different dielectric constant to match the impedances of the absorber and free space, the outermost layer having a dielectric constant of about $\epsilon_r = 15$ and the innermost layer adjacent said walls having a dielectric constant of about 10% less than that of the entire absorber.

3. A construction as claimed in claim 1, wherein the conductive material includes a semi-conductor material.

4. A construction as claimed in claim 1, wherein the conductive material includes at least one of the group consisting of graphite, carbon black, and ferrites.

5. A construction as claimed in claim 1, wherein the density of said foam decreases in the direction of free space.

6. A construction as claimed in claim 1 comprising a protective means on said walls having a dielectric constant of less than about 2.

7. A construction as claimed in claim 1 wherein said wall elements are planar elements.

8. A construction as claimed in claim 1 wherein said wall elements are tubular.

9. A construction as claimed in claim 1 wherein said wall elements have a substantial thickness to provide mechanical solidity.

References Cited

UNITED STATES PATENTS

| 2,822,539 | 2/1958 | McMillan | 343—18 |
| 2,985,880 | 5/1961 | McMillan | 343—18 |
| 3,234,549 | 2/1966 | McMillan | 343—18 |

FOREIGN PATENTS

| 776,158 | 6/1957 | England. | |

RODNEY D. BENNETT, Jr, *Primary Examiner.*

B. L. RIBANDO, *Assistant Examiner.*